(12) United States Patent
Eble et al.

(10) Patent No.: US 12,593,852 B2
(45) Date of Patent: Apr. 7, 2026

(54) FILLING MACHINE AND METHOD FOR RADIALLY ALIGNING A SPOUT

(71) Applicant: Albert Handtmann Maschinenfabrik Gmbh & Co. KG, Biberach (DE)

(72) Inventors: Luis Eble, Wolpertswende (DE); Marcel Nusser, Laupheim (DE); Gerhard Schliesser, Wain (DE)

(73) Assignee: ALBERT HANDTMANN MASCHINENFABRIK GMBH & CO. KG, Biberach (DE)

( * ) Notice: Subject to any disclaimer, the term of this patent is extended or adjusted under 35 U.S.C. 154(b) by 0 days.

(21) Appl. No.: 18/830,369

(22) Filed: Sep. 10, 2024

(65) Prior Publication Data

US 2025/0081974 A1      Mar. 13, 2025

(30) Foreign Application Priority Data

Sep. 13, 2023    (EP) .................................... 23197204

(51) Int. Cl.
*A22C 11/00*          (2006.01)
*A22C 11/02*          (2006.01)

(52) U.S. Cl.
CPC ................................ *A22C 11/0209* (2013.01)

(58) Field of Classification Search
CPC ............ A22C 11/0209; A22C 11/0245; A22C 11/0227; A22C 11/125
USPC .......................................................... 452/22
See application file for complete search history.

(56) References Cited

U.S. PATENT DOCUMENTS

| | | | | |
|---|---|---|---|---|
| 4,447,933 | A | * | 5/1984 | Spiegelberg ....... A22C 11/0263 452/45 |
| 9,314,035 | B2 | | 4/2016 | Krompholz et al. |
| 10,306,900 | B2 | | 6/2019 | Mach et al. |
| 10,542,482 | B2 | | 1/2020 | Mach et al. |
| 2014/0287664 | A1 | * | 9/2014 | Schmid .................. A22C 11/02 452/31 |

FOREIGN PATENT DOCUMENTS

| | | |
|---|---|---|
| EP | 1121861 A2 | 8/2001 |
| EP | 1260143 A1 | 11/2002 |
| EP | 2745698 A1 | 6/2014 |
| EP | 2873324 A2 | 5/2015 |
| EP | 3449729 A1 | 3/2019 |
| EP | 3566584 A1 | 11/2019 |
| JP | 2014121316 A | 7/2014 |

OTHER PUBLICATIONS

Japan Patent Office, Office Action Issued in Application No. 2024-144099, Oct. 28, 2025, 10 pages. (Submitted with Machine Translation).

* cited by examiner

*Primary Examiner* — Richard T Price, Jr.
(74) *Attorney, Agent, or Firm* — McCoy Russell LLP

(57) ABSTRACT

The disclosure relates to a filling machine and a method for filling foodstuffs, in particular for sausage production, with a spout for ejecting the foodstuff and with a support device for supporting, in particular rotatably supporting the spout about a longitudinal axis L. The device for radially aligning the bent spout has a movable bending element which may bend and align the spout at least in sections.

20 Claims, 6 Drawing Sheets

FILLING MACHINE AND METHOD FOR RADIALLY ALIGNING A SPOUT

CROSS REFERENCE TO RELATED APPLICATION

The present application claims priority to European Patent Application No. 23 197 204.3 filed on Sep. 13, 2023. The entire contents of the above-listed application are hereby incorporated by reference for all purposes.

TECHNICAL FIELD

The disclosure relates to a filling machine for filling foodstuffs, and to a method for radially aligning a spout.

BACKGROUND

Filling machines for filling foodstuffs have filling tubes for ejecting the foodstuff. In industrial food processing, in particular in the production of sausages, automatic filling machines are often used, which are operated by an operator. In these automatic filling machines, the spouts, e.g. fixed filling tubes or driven twist-off spouts used for holding the sausage casing and ejecting the pasty mass into the sausage casing, are not completely straight but bent during use. The spouts are, for example, 500 mm long tubes with a diameter range of 8 to 28 mm and wall thicknesses in the range of 0.35 to 1.5 mm. The bending of the spouts is caused, for example, by improper transportation, improper cleaning, improper storage and incorrect use of a casing spooler.

SUMMARY

The spouts have to be so long because the longer they are, the more shirred sausage casing may be drawn, so that there are fewer interruptions in production, i.e. (intestine) casing changes.

In practice, bent spouts lead to the following problems:
1. When drawing a new casing bead, the casing bead may be damaged. When retracting the spout into the casing brake after drawing a new sausage casing, considerable damage may occur if the spout does not enter the casing brake but collides with the adjusting screw, for example.
2. The sausage casing, the spout or the casing brake may be damaged when the spout is immersed in the casing brake.
3. Casing bursts may occur during production. In practice, the bent spouts lead to an increase in production errors, i.e. casing bursts. This is the case because the pretensioning via the casing brake acts unevenly on the spout due to the bending. In addition, in individual cases, the penetration of extraneous air may occur, which is favored by the bent spouts.
4. Bent spouts may also become critical in terms of safety if they exceed a certain bend. These are strongly deflected or kinked at high rotational speeds and may lead to damage or pose a danger to the operator.
5. But even with fixed, i.e. non-rotatably mounted spouts or filling pipes, bending may lead to the problem that the spout is then not correctly aligned with the downstream unit, e.g. a clipper.

In the prior art, attempts were made to manually realign the spouts. However, the result is not satisfactory and also not reproducible and depends heavily on the skill and quality standards of the operator. The smaller the diameter of the spout, the more deflection is required and the more difficult it is to align it reliably. The larger the diameter of the twist-off spout, the more force is required from the operator.

Spout centering devices have already been proposed for drawing a new sausage casing so that the sausage casing may be pushed onto the spout without damage (see, for example, EP 2 745 698). However, this centering only has a temporary effect when the sausage casing is drawn, so that there is no permanent straightening function after the centering device is released. This means, however, that even if the spout has been centered during drawing of the casing, the problems continue when the casing is immersed into the casing brake. Here, centering by means of mechanical forced guidance is no longer possible, as the casing has already been drawn and is arranged between the spout and possible centering.

On this basis, the present disclosure is based on the object of providing an improved filling machine and an improved method which prevent the problems with bent spouts described above.

According to the disclosure, this object is solved by the features as described herein According to the present disclosure, a filling machine for filling foodstuffs, in particular for sausage production, has a spout for ejecting the foodstuff. A corresponding spout, for example a twist-off spout, is used for ejecting the foodstuff, for example into a sausage casing shirred on the spout. The term spout also includes a fixed filling tube. The filling machine also has a support device for supporting, in particular for rotatably supporting the spout about a longitudinal axis L.

According to the disclosure, the filling machine has a device for radially aligning a bent spout in relation to the longitudinal axis. If the spout is bent, the central axis is no longer on a straight line, so that a concentricity deviation occurs when, for example, the spout is rotated about its central axis to twist off the individual sausage portions. The device for radially aligning the bent spout has a movable bending element that may bend and realign the spout at least in sections, in such a way that the central axis M of the spout may then extend substantially along the longitudinal axis L.

This allows the spout, on which the sausage casing has already been shirred, for example, to immerse into the casing brake without damaging the spout, the casing brake or the sausage casing. This effectively prevents casing bursts and other production errors. Correct alignment also allows the pretension to act evenly on the spout via the casing brake. The ingression of external air may also be prevented. This means that the filling machine may be operated safely even at high rotational speeds, as there is no strong deflection or danger to the operator The advantage also arises when drawing the sausage casing onto the spout, as it may then be precisely centered and the sausage casing may be drawn without damage. The fact that the bending element is integrated into the filling machine makes the process easier for the operating personnel and reduces the training time. Automatic straightening is also possible, especially when changing products and consequently when replacing the spouts. Overall, this results in reproducible product quality and higher line utilization due to fewer production interruptions. In addition, time is saved, especially with revolver machines where several spouts are used alternately.

According to a preferred embodiment, the bending element is movable at an angle, in particular perpendicular to the longitudinal axis, in order to bend the spout at least in sections. Advantageously, the bending element is movable perpendicular to the longitudinal axis. The spout may be bent against the curvature by the bending element, in particular the bending punch. "At an angle" means in particular at an angle of 90°±5° to the longitudinal axis L. This allows the bending element to bend the spout against the curvature. The effective angle between the bending element and the central axis M may change dynamically due to the deflection of the spout.

According to a preferred embodiment, the bending element is adapted as a bending pestle, e.g. in the form of a pressure cylinder. The bending element may be powered electrically, hydraulically, pneumatically or mechanically.

According to an embodiment, the bending pestle optionally has a recess at its end region facing the spout, in particular a substantially V-shaped, U-shaped or C-shaped recess in such a way that the spout lies in the recess and is centered and guided during bending. Due to the special design of the end region, it is possible for the spout to abut securely in the recess during the bending process and, for example, not move out of position.

According to a preferred embodiment, the spout may be bent in such a way that, at least in the end region of the spout facing away from the support device, the central axis of the spout extends along the longitudinal axis. If the spout is properly aligned at least in the end region, e.g. in the last 3 cm or 4 cm of the spout, the spout may be threaded into the casing brake without damage occurring. The feature that the central axis M of the spout extends substantially along the longitudinal axis means that the central axis either coincides with the longitudinal axis or that there are only slight deviations of the axes of 0 mm to 3 mm, or that in the end region the concentricity deviation is in the tolerance range a≤0.5 mm, optionally in the range of a≤0.3 mm.

If, according to the present disclosure, the filling machine has a casing brake in which the spout is held in a filling position, the longitudinal axis L may then extend between the support device and the casing brake, wherein the central axis M of the filling tube extends along the longitudinal axis L at least in the end region of the spout facing away from the support device.

According to a preferred embodiment, the bending element may be arranged to move back and forth along an axis parallel or inclined to the longitudinal axis L, i.e. either manually or via a corresponding drive, e.g. a motor. This allows the spout to be bent at specific points along the longitudinal axis. If the filling tube is to be continuously corrected along the longitudinal axis, this is possible via a corresponding drive in the direction of the longitudinal axis. In addition, the bending element is able to retract to a rest position in which regular operation is not disturbed. This may be realized, for example, by a lift (e.g. by a further approx. 50 mm) radial to the spout.

According to a further embodiment, the device for radially aligning the bent spout may have a sensor that may measure the concentricity deviation in particular.

The sensor may be a sensor for measuring the position of the spout outer wall, in particular a distance meter and/or adapted to measure the spout diameter (e.g. using a light band). The target position of the spout wall may be determined for the measured spout diameter. However, the nominal value for the spout diameter may also be entered via the machine control. By entering the actual value of the spout diameter, this can, for example, be compared again with the measured position of the spout outer wall in order to determine concentricity deviations.

The diameter of the spout and the degree of deflection or concentricity deviation may also be determined by the rotation-dependent force absorption of the bending element and calculated by the machine control system, provided it is prepared for this with respect to measurement (e.g. force transducer, strain gauge or measurement of the drive current for an electric motor).

Advantageously, the sensor is arranged to move back and forth along an axis parallel or inclined to the longitudinal axis L, so that a measurement in the direction of the longitudinal axis L is possible. Advantageously, the sensor may be moved back and forth together with the bending element so that the bending element may be controlled depending on the measured value, e.g. if the sensor is advancing. In this case, measurements may be taken at several points distributed in the longitudinal direction and then bent in each case, or the sensor and bending element may move continuously in the longitudinal direction and continuously measure the concentricity deviation, for example, wherein the bending element is moved accordingly in a direction transverse to the longitudinal axis L and exerts a corresponding pressure in order to straighten the spout.

According to an embodiment, the spout may be rotated via a servo drive with position detection of the angular position. This allows the sensor to specifically detect deviations depending on the angular position of the spout and the bending element may also specifically compensate for the deviation from the correct direction.

Advantageously, the filling machine has a control system which, depending on a sensor signal, determines the movement of the bending element relative to the longitudinal axis and controls a drive of the bending element accordingly, in particular displacement-controlled and/or force-controlled, and optionally determines the movement of the bending element in the direction of the longitudinal axis and controls a corresponding drive of the bending element for this movement.

Alignment may be carried out from the clamping point, i.e. from the support device to the open end of the spout. Depending on the number of measured points that deviate from the central axis, the spout may be aligned almost exactly as required. The greater the number of points set and the narrower the tolerance, the more accurate, but more time-consuming, the method is. The movement perpendicular or at an angle to the longitudinal axis is carried out depending on the measured deviation at this position. The powering of the bending element for a movement towards the longitudinal axis may be realized, for example, by an electric, hydraulic, pneumatic or mechanical drive, e.g. by a pneumatic cylinder. The movement in the direction of the longitudinal axis may be realized by a drive system comprising, for example, a motor, in particular a stepper motor or servomotor and/or a gearbox with a carriage on a toothed belt axis.

However, it is also possible that, according to a further embodiment for radially aligning a bent spout, the device has a lever which moves the bending element, in particular the bending pestle, in particular by manual force, wherein optionally a limit stop is provided for the lever and optionally different limit stop positions are adjustable. Such a solution is inexpensive and easy to implement and may also be retrofitted to existing machines. The lever enables a safe method for the operator, as he does not have to touch any rotating parts by hand. By implementing a limit stop for the lever, the result is reproducible. Different limit stop positions may be selected for different spouts. The lever and the bending element may be stationary or move back and forth on an axis parallel to the longitudinal axis. In addition, a counter-holding device may be placed opposite the bending element.

The device for radially aligning, in particular the lever, may be attached to the filling machine at least temporarily, i.e. it is possible to dismantle or retrofit the device for radially aligning after alignment.

According to a further embodiment, the device for radially aligning a bent spout may have a roll straightening device with several bending elements in the form of pre-stressed rollers arranged one behind the other and around the spout circumference, as viewed in the longitudinal direction of the spout, which may bend and straighten the spout alternately, wherein the roll straightening device may optionally be moved back and forth parallel to the longitudinal direction L. The roll straightening device may then be moved along the spout manually or automatically, for example. This ensures that the axis is correctly aligned.

According to the method of the disclosure for radially aligning a spout, in particular with a filling machine, a bent spout is clamped in a support device for supporting, in particular for rotatably supporting the spout about a longitudinal axis L, wherein a bending element optionally moves at an angle, in particular perpendicular to the longitudinal axis L, and the spout is bent at least in sections for radially aligning the bent spout.

This means, for example, that depending on a deviation of the spout center axis M from a longitudinal axis L or a deviation of the position of the spout outer wall from a corresponding target position, a bending element bends the spout in order to compensate for this deviation.

Advantageously, a sensor may in particular measure the concentricity deviation, optionally the position of the spout outer wall at several points along the spout (at several points or continuously over the length) and in particular depending on the angle of rotation of the spout, i.e. at a certain angle of rotation when the spout is not rotated during straightening.

According to a preferred embodiment, the spout rotates during alignment by means of the bending element, wherein the bending element moves, in particular from the support element, i.e. e.g. from the clamping point to the tip of the filling tube facing away from the support device and then optionally slowly moves back, in particular back to the central area, or the spout is stationary, wherein the spout is optionally supported by a counter-holder and the bending element presses on the spout in a force-controlled or displacement-controlled manner at one or more positions (also continuously) of the spout.

According to a preferred embodiment, only the end region of the spout facing away from the support device, e.g. the last 3 cm to 4 cm, is deflected and straightened by the bending element. If the central axis M of the spout substantially coincides with the longitudinal axis L in this area, the spout may be safely retracted into the casing brake.

The bent spout is aligned before a sausage casing is drawn. If the spout is aligned before the sausage casing is drawn, this has the advantage of minimizing the risk of injury to the sausage casing during drawing, as the spout may be precisely centered in relation to the sausage casing.

According to an embodiment, the bending element may perform a rotary movement and be a revolver in which the support device is arranged, wherein the revolver may be rotated about an axis parallel to the longitudinal axis L and may move the spout clamped centrally in a clamping device by this rotary movement. This means that the revolver, which is already present anyway, may be used for bending the spout in order to rotatably support several filling tubes and bring them into a filling position for threading into the casing brake by rotating them.

BRIEF DESCRIPTION OF THE FIGURES

The disclosure is explained in more detail below with reference to the following figures.

DETAILED DESCRIPTION

Figure 1:
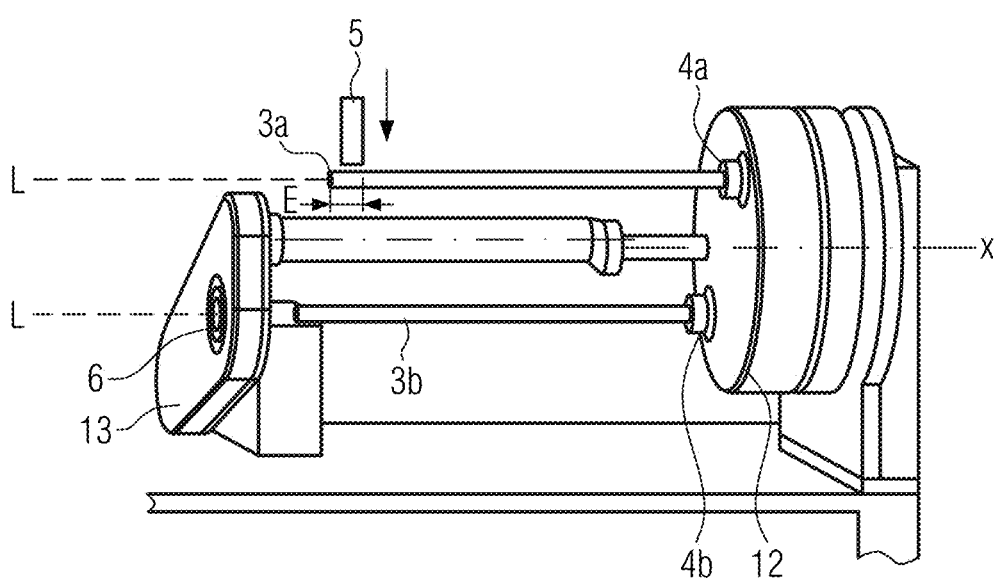
FIG. 1 shows a rough schematic perspective view of a spout arrangement of a filling machine according to the present disclosure

FIG. 1 shows a possible embodiment according to the present disclosure with two filling tubes 3a, 3b in the form of spouts, which are arranged on a revolver 12 rotatable about an axis X and may be pivoted by rotating the revolver from a position for applying the sausage casings to a filling position, in which the spout 3b may then be pushed into a casing brake 6, which is located, for example, in the brake ring housing 13. It is also possible, for example, for the brake ring gear 13 to be swiveled away from the spout and towards the spout. FIG. 1 shows only one possible example.

The spout 3b located in the filling position is connected via a pump, e.g. vane cell pump (not shown), e.g. to a funnel in such a way that, for example, pasty mass may be ejected via the spout 3 into a sausage casing, wherein the casing brake 6 presses the sausage casing onto the spout.

As already described above, bending of the spouts 3 may easily occur, which are, for example, 400 to 600 mm long, have a diameter in the range of 8 mm to 28 mm and a wall thickness of 0.35 mm to 1 mm. As already described, this deflection causes considerable problems, especially when the spout 3b is to be inserted into the casing brake 6 (see FIG. 1).

The spout may be powered as described, i.e. it may be a twist-off spout or, in the embodiments where no rotary movement is required, a stationary filling tube.

Figure 7:
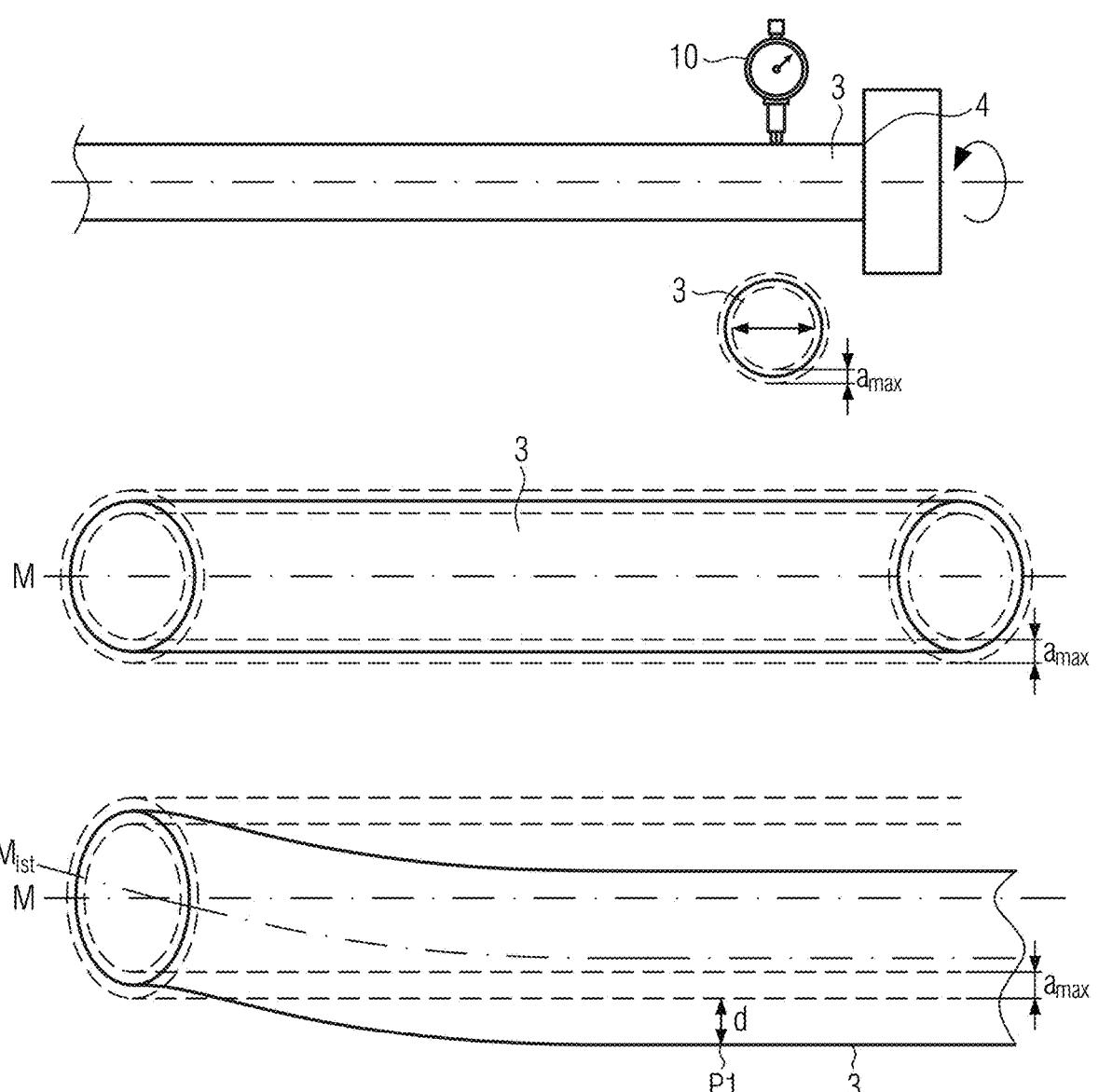

FIG. 7, top and middle illustration, shows, for example, an aligned spout and the bottom illustration shows a bent spout 3. As may be seen from FIG. 1, the spout 3 is supported in a support device 4 so that it may rotate about a longitudinal axis L. If the spout 3 is bent, the actual central axis $M_{ist}$ of the spout no longer coincides with the longitudinal axis L. This results in an imbalance of the rotating spout. To ensure that the filling machine functions properly, a certain concentricity deviation $a_{max}$ must not be exceeded. The maximum permissible concentricity deviation $a_{max}$ is, for example, 0.3 mm-0.5 mm, i.e. a deviation of $\pm\frac{1}{2}$ a from a target position of the cylindrical outer surface of the spout. As may be seen from FIG. 7, the position of the spout outer wall lies outside the acceptable tolerance at point P1, for example it is bent downwards by the deviation d. A deviation may be detected, for example, by a distance sensor 10 shown in FIG. 7, which will be explained in more detail below, or by the operator.

According to the present disclosure, the filling machine according to the disclosure has a device 2 for radially aligning a bent spout 3 in such a way that the tube may be straightened again against the curvature. For this purpose, a movable bending element 5 is provided, which may bend the spout 3 at least in sections, in such a way that the spout outer wall lies within the concentricity deviation $a_{max}$, at least in the end region E (see FIG. 1) of the spout, wherein the end region E corresponds, for example, to the last 3 cm or 4 cm of the filling tube.

Figure 2:
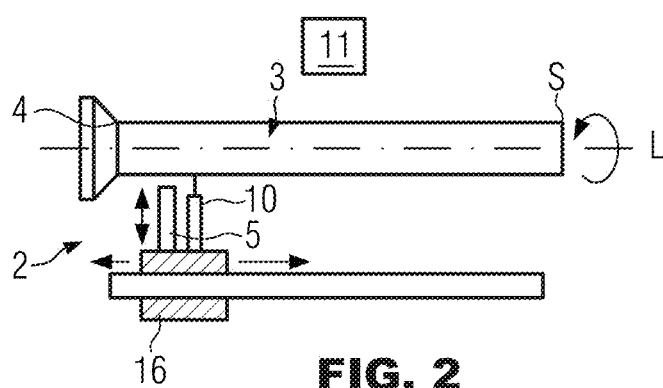
FIG. 2 shows a roughly schematic embodiment of a device for radially aligning a bent spout according to a first embodiment

FIG. 2 shows a first embodiment according to the present disclosure. FIG. 2 shows the spout 3, which is rotatably supported in the support device 4. Furthermore, according to this embodiment, a bending element 5 is provided which, as shown by the arrow, may be moved back and forth perpendicular to the longitudinal axis L. Even if not shown here, the bending element does not necessarily have to move perpendicular to the longitudinal axis L, but may also press on the tube at an angle of 80°-100°, optionally 85° to 95° straight to the longitudinal axis L. The bending element 5 is optionally a bending pestle that may be powered, for example electrically, hydraulically, pneumatically or mechanically. The bending pestle 5 is designed, for example, as a pneumatic cylinder and may be moved back and forth on a slide 16 in a direction along the longitudinal axis L. A corresponding drive may also be provided for this purpose, for example a servomotor. In this embodiment, an optional sensor 10 is provided which can, for example, measure the concentricity deviation a, i.e. the position of the spout outer wall. In particular, the sensor may be a distance meter. The sensor may also be a sensor for measuring the spout diameter.

Various sensors may be used to detect the out-of-roundness or imbalance of the spout, for example sensors are adapted for optical measurement, for example by laser or light section sensor inductive or capacitive measurement radar sensor, ultrasonic sensor, Hall sensor camera, measurement of the shadow cast, . . . .

tactile measurement, for example using electromechanical feelers or tactile dial gauges (see FIG. 7).

measurement of structure-borne noise (vibrations on the machine) or airborne noise measurement via the current consumption of the spout drive, etc. This measurement may at least be used to detect the presence of an imbalance.

In the embodiment shown in FIG. 2, the spout 3 rotates around the longitudinal axis L during alignment, wherein the bending pestle 5 on the spout 3 moves from the support device 4, i.e. the clamping point, to the tip S and deflects the spout 3 further and further. The spout rotates during this process and is thus radially aligned. At the tip S, the bending pestle 5 slowly moves back to a center position between the tip S and the support device 4. Depending on the diameter and the sensor signal, i.e. the measured position of the spout outer wall, a control system 11 may determine the movement of the bending element in a direction perpendicular to the longitudinal axis L (and, for example, bring the bending element into a position that corresponds to the target position of the spout outer wall and control the drive of the bending element 5 accordingly, in particular displacement-controlled, so that the tube may be radially aligned again at a certain position, as may also be seen from FIG. 7. The spout may be easily aligned by rotating it. The movement of the bending element 5 in the direction of the longitudinal axis L is also determined by the control system and the drive of the bending element, for example a stepper motor, is powered accordingly, i.e. the movement towards the spout 3 and along the longitudinal axis L is coordinated. The spout diameter may also be measured or entered for this purpose. This was just one example of how a machine control system determines the necessary movement of the bending pestle, in this case in the direction L and perpendicular to the axial direction L.

Figure 3:
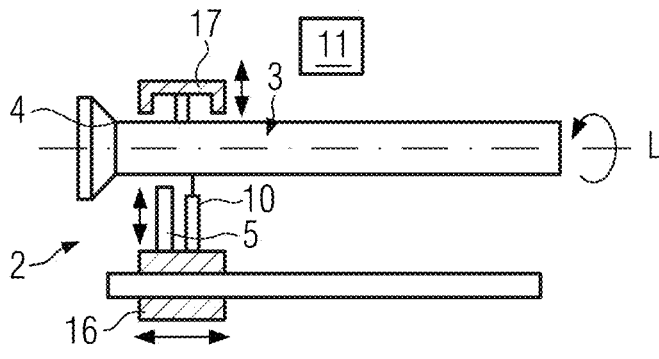
FIG. 3 shows a device for radially aligning a spout according to a further embodiment

FIG. 3 shows a further embodiment according to the present disclosure. Here, the bending pestle 5 does not press on the rotating spout 3, but on a stationary filling tube 3 or spout, which is supported by a counter-holder 17 opposite the slide with the bending pestle 5. This ensures that targeted bending may take place at any point on the spout. The counter-holder may either be designed on both sides or only on one side between the bending element and the support device, so that the point on the longitudinal axis around which bending is to take place may be determined. This means that it is not necessarily required to bend around the support device 4.

As in the previous embodiment, a sensor 10 is also provided on the slide 16 in order to determine the concentricity deviation, in particular the position of the spout outer wall at several points along the longitudinal axis L or continuously over the entire length. Depending on the sensor signals, the movement of the bending pestle 5 may then be determined accordingly by the control system and the pestle may be controlled in a force-controlled or displacement-controlled manner. In addition, the spout may be positioned in the opposite direction to the measured deviation via the servomotor of the spout drive by specifying the angle of rotation so that the bending pestle may bend in the direction opposite to the bending. This allows the spout to be aligned with the minimum number of bending operations if this is not done continuously. The alignment is also carried out continuously or at several points from the clamping point on the support device 4 to the tip S of the spout. Depending on the number of points measured and deviating from the target position, the spouts may be aligned as precisely as required. The greater the number of points set and the narrower the tolerance, i.e. in particular the maximum concentricity deviation a, the more precise the method is.

Figure 8A:
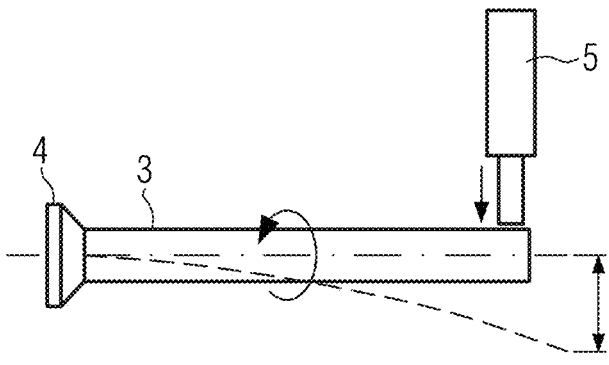
FIGS. 8 A, B, C show schematic side views of further embodiments according to the disclosure.
Figure 8B:
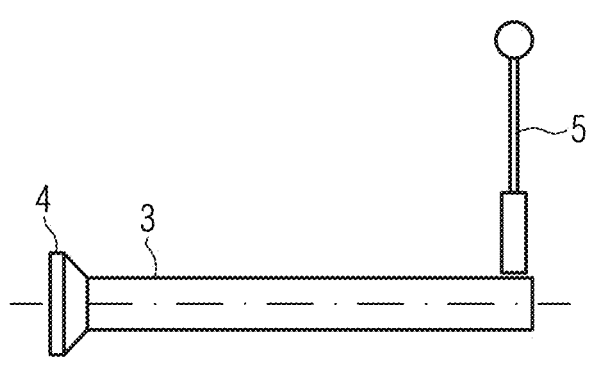

As already explained above, it is also possible, if at least the presence of an imbalance is detected, that instead of the entire spout only the end region, i.e. for example the last 3 cm to 4 cm of the spout, as shown in FIGS. 8A, 8B, is deflected by a bending pestle 5. In such a way, the bending pestle presses on the spout 3 at least in the end region E, i.e. the last 3 or 4 cm, that the central axis of the spout substantially coincides with the longitudinal axis L at least in the end region. The spout rotates during alignment.

Figure 4:
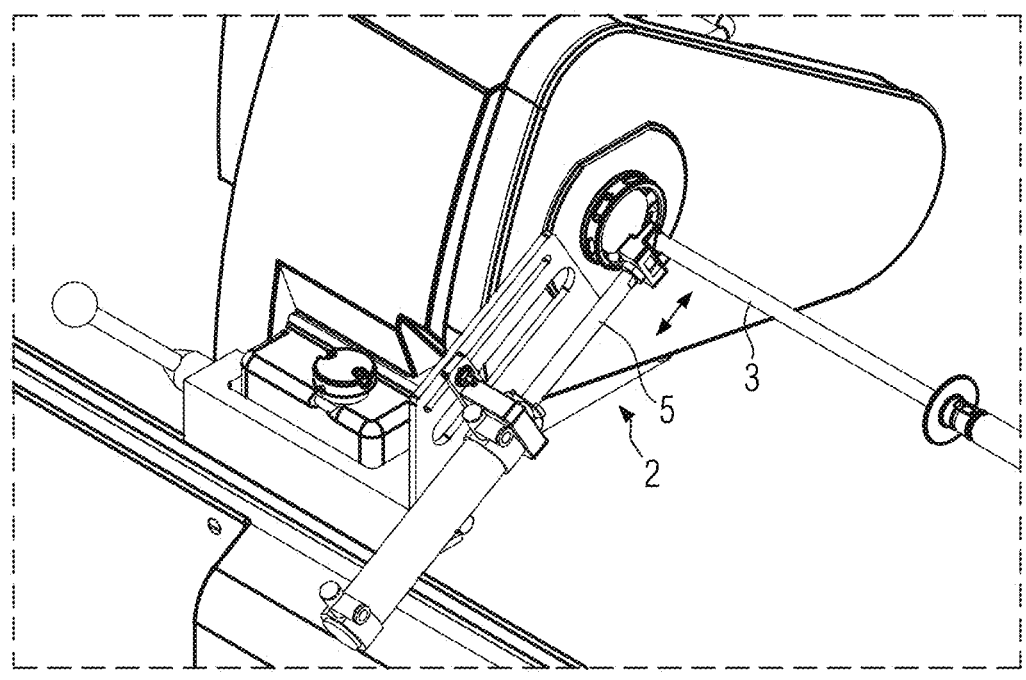
FIG. 4 shows a device for aligning a spout according to a further embodiment

In this embodiment, the alignment is optionally carried out independently of a measured concentricity deviation of the tube. By optionally slowly moving the bending pestle 5 back from the tip S to a central area of the spout 3 (while the spout is rotating), the spout 3 runs substantially round after deflecting. The diameter may be set by the operator and the device then bends the spout accordingly. The plunger may be designed electrically, hydraulically, pneumatically or mechanically and is adapted as shown in FIG. 4, for example as a pneumatic cylinder. The pneumatic cylinder is arranged here in an end region of the spout and may be moved back and forth parallel to the longitudinal axis L, as described in previous embodiments.

Figure 5A:
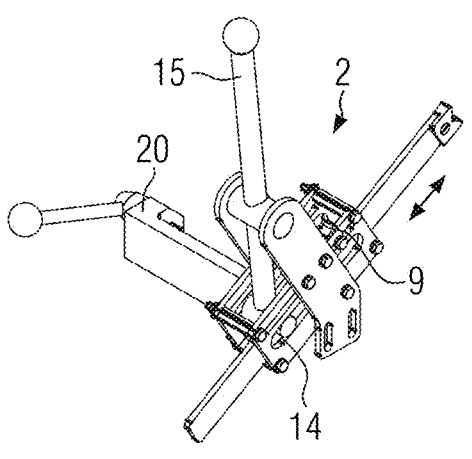
FIGS. 5A, 5B show a perspective view of a further embodiment of a device for radially aligning a spout by means of a lever
Figure 5B:
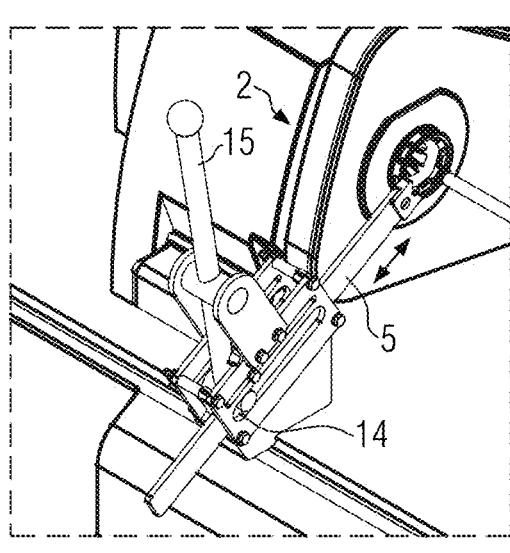

FIGS. 5A and 5B show a further embodiment according to the present disclosure. The bending pestle 5 may be moved here by using manual force via a lever. A corresponding embodiment is very simple, but no longer automated. The lever makes the concept safe for the operator, as no rotating parts are touched by hand. The device 2 has, for example, a guide 14 for the plunger and a corresponding hand lever 15. In addition, the device has a fastening device 20, here a clamping element, via which the device 2 may be at least temporarily fastened to the filling machine. The bending pestle 5 here has a limit stop 9. Depending on the mounted spout 3, this may be set to a marked position, for example. This allows the spouts to be reproducibly adjusted for consistent accuracy. Different limit stop positions or limit stops 9 are required for different spouts, wherein spouts with the same settings may be straightened well. By pulling the lever 15, the bending pestle 5 is moved perpendicular to the longitudinal axis L to deflect the spout. The lever 15 is then slowly moved back to the starting position.

The hand lever may either be arranged at a fixed position in the end region of the spout, viewed in the direction of the longitudinal axis L, and only press on the filling tube at this point so that at least the end region of the spout is radially aligned, or it may also be moved back and forth manually along an axis parallel to the longitudinal axis L, for example. A counter-holder (not shown), which may also be moved parallel to the longitudinal axis, may also be provided for this purpose.

In this simplified version, no sensor is stringently necessary due to the preset limit stops. The method according to this embodiment is advantageously carried out with the spout rotating so that the deformation is uniform.

Figure 8C:
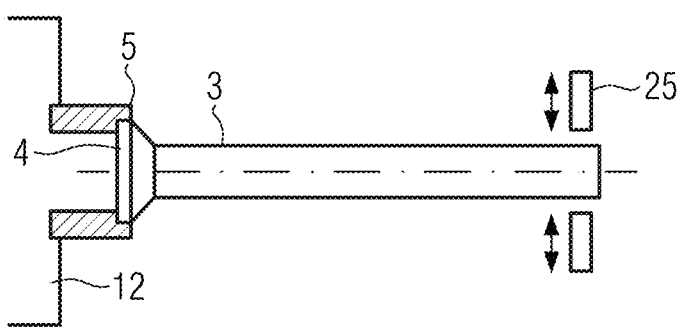

In another embodiment, the revolver 12 takes over the function of the movable bending element as shown in FIG. 8 C. The function of the bending pestle 5 is taken over by the revolver movement (the rotation of the axis x to bring the various spouts into the filling position, for example, as shown in FIG. 1). For the straightening process, the spout 3 is held centered at the tip S or in the front area by a clamping device 25. The straightening process takes place with the spout stationary. This requires the use of a sensor to determine the size and direction of the deviation. The spout must be positioned at an exact angle for the alignment process. In this case, the clamping point of the spout is deflected and not the tip as in the preceding examples.

Figure 6A:
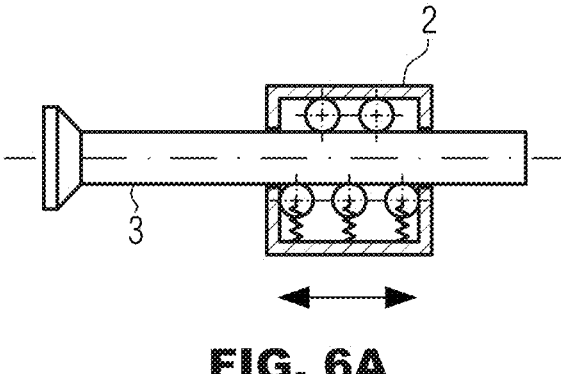
FIGS. 6A, 6B show a further embodiment according to the present disclosure with a roll straightening device FIG. 7 schematically shows an assembly with a sensor for measuring the concentricity deviation, as well as a straight and a bent tube.
Figure 6B:
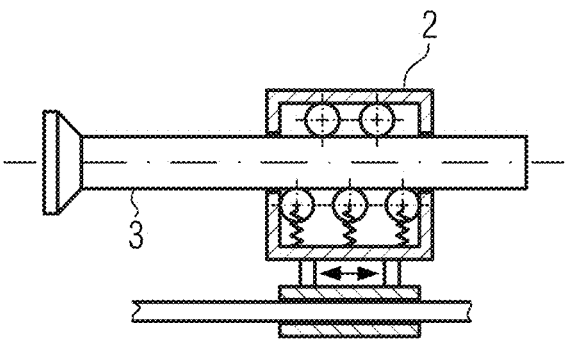

FIGS. 6A and 6B show a further embodiment according to the present disclosure. The device for radially aligning the bent spout 3 may also have a roll straightening device 2 with a plurality of bending elements 5 in the form of pretensioned rollers, which are arranged one behind the other and around the spout circumference as viewed in the longitudinal direction of the spout and which may alternately bend and straighten the spout 3, wherein optionally the roll straightening device may be moved back and forth parallel to the longitudinal direction L. The roll straightening device may then be moved along the spout by hand or automatically by means of a drive, for example. This ensures that the axis is correctly aligned.

In the embodiments with upright spouts, a counter-holder device is advantageous.

According to an embodiment, the bending pestle optionally has a recess at its end region facing the spout, in particular a substantially V-shaped, U-shaped or C-shaped recess in such a way that the spout lies in the recess during bending. Due to the special design of the end region, it is possible for the spout to abut securely in the recess during the bending process and, for example, not move out of position.

In the method according to the disclosure, a bent spout is clamped in a support device 4 for supporting the spout rotatably about a longitudinal axis L and a bending element 5 moves in such a way that the twist-off spout is bent at least in sections for radially aligning it. The examples shown of how the bending element is moved and the optional use of a sensor are only exemplary. It is substantial that the device for radially aligning the bent spout is integrated in the filling machine in order to permanently bend at least the front or rear end region of the spout and thereby straighten it so that the spout may be arranged exactly centrally when threading sausage casings, in particular casing beads, and also does not cause any problems when threading it into the casing brake.

In the method according to the disclosure, it is advantageous that the bending element, i.e. the bending pestle, can, for example, retract quickly (e.g. 30-50 mm/s) and extend more slowly from the engagement from the rotating spout (e.g. 5-20 mm/s). The force may be controlled up to a target force of e.g. 10 N to 300 N, in particular 150 N. The travel may also be limited via an end limit stop or a position specification for an actuator (e.g. with positions for each variant of a spout or the spout diameter).

Figure 9:
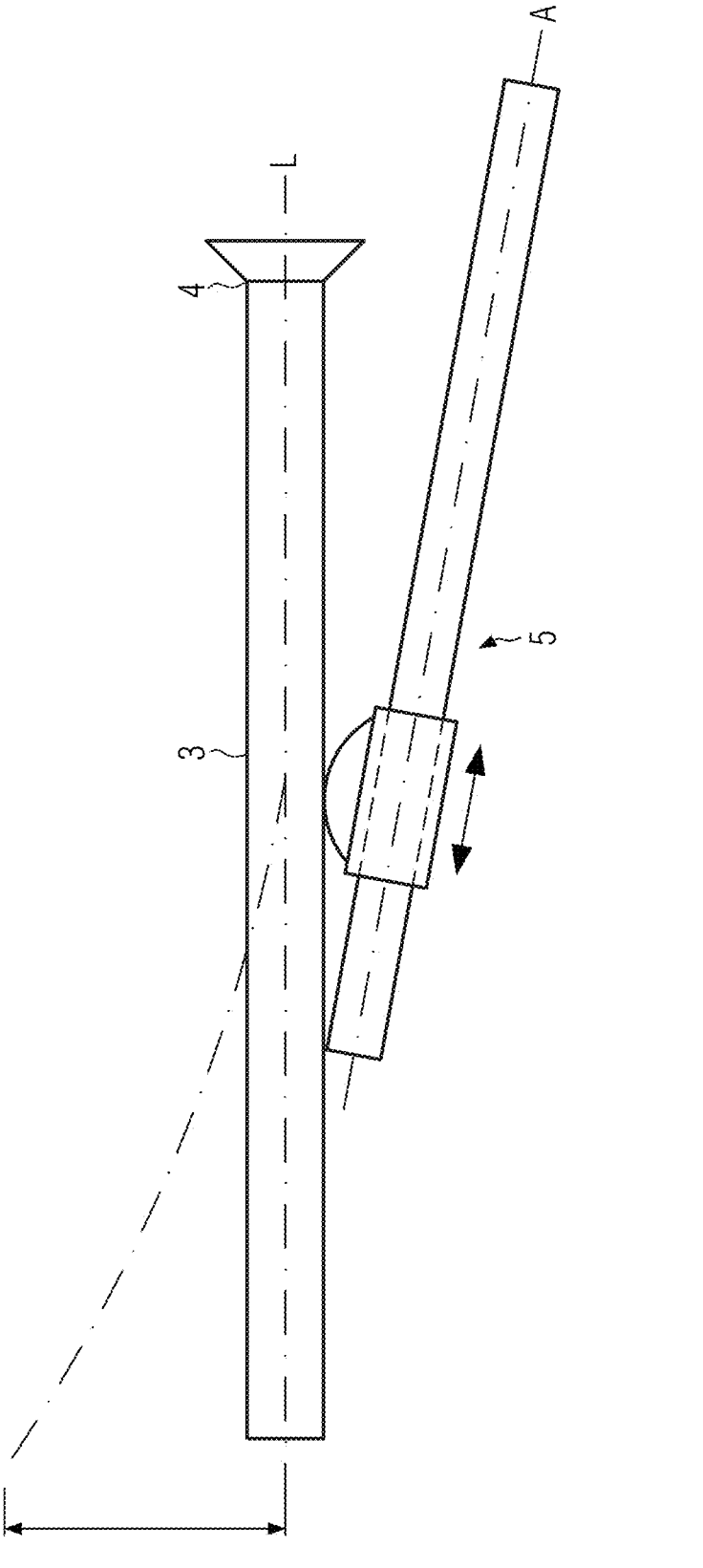
FIG. 9 shows a further embodiment according to the present disclosure.

FIG. 9 shows a further embodiment according to the present disclosure. Here, the bending element 5 is not movable back and forth parallel to the longitudinal axis L, but along an axis A of a corresponding guide, which runs inclined to the longitudinal axis L. FIG. 9 also shows the possible deflection due to the inclined linear movement of the bending element 5 in dashed lines. It is possible, as described above in connection with the preceding embodiments, that a sensor is also arranged to move back and forth along the inclined axis and precedes the bending element 5.

The invention claimed is:

1. Filling machine for filling foodstuffs with
a spout for ejecting the foodstuff, and with
a support device for supporting the spout about a longitudinal axis; and
a device for radially aligning a bent spout, which has a bending element, which is adapted in such a way that the bending element may bend and align the spout at least in sections.

2. Filling machine according to claim 1, wherein the bending element is movable at an angle, in order to bend the spout at least in sections.

3. Filling machine according to claim 2, wherein the spout may be bent in such a way that, at least in the end region of the spout facing away from the support device, the central axis of the spout extends substantially along the longitudinal axis.

4. Filling machine according to claim 2, wherein the bending element is designed as a bending pestle, which has a recess, including a substantially V-shaped, U-shaped or C-shaped recess, at its end region facing the spout in such a way that the spout lies in the recess during bending.

5. Filling machine according to claim 1, wherein the bending element is arranged to be movable back and forth along an axis parallel or inclined to the longitudinal axis.

6. Filling machine according to claim 1, wherein the device for radially aligning the bent spout has a sensor which measures a concentricity deviation.

7. Filling machine according to claim 6, wherein the sensor is arranged to be movable back and forth, together with the bending element, along an axis parallel or inclined to the longitudinal axis.

8. Filling machine according to claim 6, wherein the spout is rotatable via a servo drive with position detection of the angular position.

9. Filling machine according to claim 6, wherein a control system, depending on a sensor signal, determines the movement of the bending element to the longitudinal axis and controls a drive of the bending element accordingly.

10. Filling machine according to claim 1, wherein the device for radially aligning a bent spout has a lever which moves the bending element, by manual force.

11. Filling machine according to claim 10, wherein a limit stop is provided for the lever and different limit stop positions are adjustable.

12. Filling machine according to claim 1, wherein the device for radially aligning is at least temporarily attachable to the filling machine.

13. Filling machine according to claim 1, wherein the device for radially aligning a bent spout has a roll straightening device, wherein a plurality of bending elements in the form of pretensioned rollers are arranged one behind the other and around the spout circumference as viewed in the longitudinal direction of the spout, which are capable of alternately bending and straightening the spout, wherein the roll straightening device is movable back and forth parallel to the longitudinal direction.

14. Method for radially aligning a spout with a filling machine according to claim 1, wherein a bent spout is clamped in a support device for supporting the spout about a longitudinal axis, and a bending element bends the bent spout at least in sections for radially aligning it and moves at an angle.

15. Method according to claim 14, wherein a sensor measures the concentricity deviation.

16. Method according to claim 14, wherein the spout rotates during alignment by the bending element, wherein the bending element moves from the support device to the spout tip facing away from the support device and then moves back into the central area, or the spout is stationary, wherein the spout is supported by a counter-holder during alignment and the bending element presses on the spout in a force-controlled or displacement-controlled manner at one or more positions of the spout.

17. Method according to claim 14, wherein only the end region of the spout facing away from the support device is deflected and straightened by the bending element.

18. Method according to claim 14, wherein the bent spout is radially aligned before a sausage casing is drawn.

19. Device according to claim 1, wherein the bending element performs a rotary movement and is a revolver in which the support device is arranged and which itself may be rotated about an axis parallel to the longitudinal axis L and may move the spout clamped centrally in a clamping device by this rotary movement.

20. Filling machine according to claim 1 wherein filling foodstuffs include sausage production.

\*   \*   \*   \*   \*